(12) United States Patent
Yang (10) Patent No.: US 12,130,511 B2
(45) Date of Patent: Oct. 29, 2024

(54) DISPLAY DEVICE

(71) Applicant: LG ELECTRONICS INC., Seoul (KR)

(72) Inventor: Youngjin Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 106 days.

(21) Appl. No.: 17/790,625

(22) PCT Filed: Jan. 3, 2020

(86) PCT No.: PCT/KR2020/000102
§ 371 (c)(1),
(2) Date: Jul. 1, 2022

(87) PCT Pub. No.: WO2021/137340
PCT Pub. Date: Jul. 8, 2021

(65) Prior Publication Data
US 2023/0037880 A1    Feb. 9, 2023

(51) Int. Cl.
*G02F 1/1333* (2006.01)
*G02F 1/13357* (2006.01)

(52) U.S. Cl.
CPC .. *G02F 1/133314* (2021.01); *G02F 1/133605* (2013.01); *G02F 1/133606* (2013.01); *G02F 1/133608* (2013.01)

(58) Field of Classification Search
CPC ......... G02F 1/133314; G02F 1/133605; G02F 1/133606; G02F 1/133608; G02F 1/133602; G02F 1/133317
See application file for complete search history.

(56) References Cited

U.S. PATENT DOCUMENTS

| 2008/0192168 | A1  | 8/2008 | Sudo | |
| 2012/0008061 | A1* | 1/2012 | Jang | G02F 1/133308 349/58 |
| 2014/0132878 | A1* | 5/2014 | Zhang | G02F 1/133308 349/58 |
| 2016/0123555 | A1* | 5/2016 | Oh | G02F 1/133611 362/97.1 |

FOREIGN PATENT DOCUMENTS

| KR | 10-2012-0005277 A | 1/2012 |
| KR | 10-1616479 B1 | 4/2016 |
| KR | 10-2016-0051568 A | 5/2016 |
| KR | 101616479 | * 10/2016 |

* cited by examiner

*Primary Examiner* — Paisley L Wilson
*Assistant Examiner* — Agnes Dobrowolski
(74) *Attorney, Agent, or Firm* — Birch, Stewart, Kolasch & Birch, LLP

(57) ABSTRACT

A display device is disclosed. The display device of the present disclosure may comprise: a display device comprising: a flexible display panel; a panel roller which is elongated and on or from which the display panel is wound or unwound; a housing in which the panel roller is accommodated, wherein while the display panel is unwound from the panel roller, the display panel descends below the housing; and a board case which is disposed behind the display panel descending below the housing, and of which the front surface is covered by the display panel while the display panel descends.

8 Claims, 12 Drawing Sheets

DISPLAY DEVICE

CROSS REFERENCE TO RELATED APPLICATIONS

This application is the National Phase of PCT International Application No. PCT/KR2020/000102, filed on Jan. 3, 2020, which is hereby expressly incorporated by reference into the present application.

TECHNICAL FIELD

The present disclosure relates to a display device.

BACKGROUND ART

As the information society has developed, the demand for display device is increasing in various forms, and accordingly, in recent years, various display devices such as a liquid crystal display (LCD), plasma display panel (PDP), electroluminescent display (ELD), vacuum fluorescent display (VFD), organic light emitting diodes (OLED), and the like have been studied and used.

Among them, a liquid crystal panel of an LCD includes a TFT substrate and a color filter substrate facing each other with a liquid crystal layer and a liquid crystal layer interposed therebetween, and an image can be displayed using light provided from the backlight unit.

Recently, many studies have been conducted on structures for improving the quality and durability of LCD display devices.

DISCLOSURE

Technical Problem

The present disclosure is directed to solve the above and other problems. Another aspect is to improve the reliability of a display device.

Another aspect of the present disclosure is to ensure the structural stability of a display panel.

Yet another aspect of the present disclosure is to prevent damage to a guide panel caused by torsion, compression, and/or tension.

A further aspect of the present disclosure is to prevent a corner portion of a display panel from breaking due to an external force.

A further aspect of the present disclosure is to improve deformation of optical sheets caused by thermal expansion and contraction.

Technical Solution

An embodiment of the present disclosure provides a display device comprising: a display panel; a frame positioned at the rear of the display panel; an optical assembly which is positioned between the display panel and the frame and provides light to the display panel; and a guide panel which is positioned between the circumference of the display panel and the circumference of the frame, is coupled to the frame so as to support the display panel, and has elasticity.

Advantageous Effects

A display device according to the present disclosure has the following effects.

According to at least one of the embodiments of the present disclosure, it is possible to ensure the structural stability of a display panel.

According to at least one of the embodiments of the present disclosure, it is possible to prevent damage to a guide panel caused by torsion, compression, and/or tension.

According to at least one of the embodiments of the present disclosure, it is possible to prevent a corner portion of a display panel from breaking due to an external force.

According to at least one of the embodiments of the present disclosure, it is possible to improve deformation of optical sheets caused by thermal expansion and contraction.

Additional scope of applicability of the present disclosure will become apparent from the following detailed description. However, various changes and modifications within the spirit and scope of the present disclosure may be clearly understood by those skilled in the art, and thus, it should be understood that specific embodiments, such as the detailed description and preferred embodiments of the present disclosure, are given only by way of illustration.

MODE FOR DISCLOSURE

Hereinafter, embodiments of the present disclosure will be described in detail with reference to the accompanying drawings, however, the same or similar elements are denoted by the same reference numerals regardless of the reference numerals, and redundant description thereof will be omitted. The suffixes "module" and "part" for components used in the following description are given or mixed in consideration of ease of specification, and do not have their own meaning or role. Further, in describing the embodiments disclosed in this specification, when it is determined that the detailed description of the related art is likely to blur the gist of the embodiment disclosed in this specification, a detailed description thereof will be omitted. Also, the accompanying drawings are only for the purpose of easily understanding the embodiments disclosed in the present disclosure, and the technical idea disclosed in the present disclosure is not limited by the accompanying drawings, it should be understood that the present disclosure include all modifications, equivalents and substitutes included within the spirit and technical scope of the present disclosure.

Hereinafter, a display panel will be described by taking, as an example, a liquid crystal display (LCD) panel, the display panel applicable to this disclosure is not limited to the liquid crystal display panel.

Figure 1:
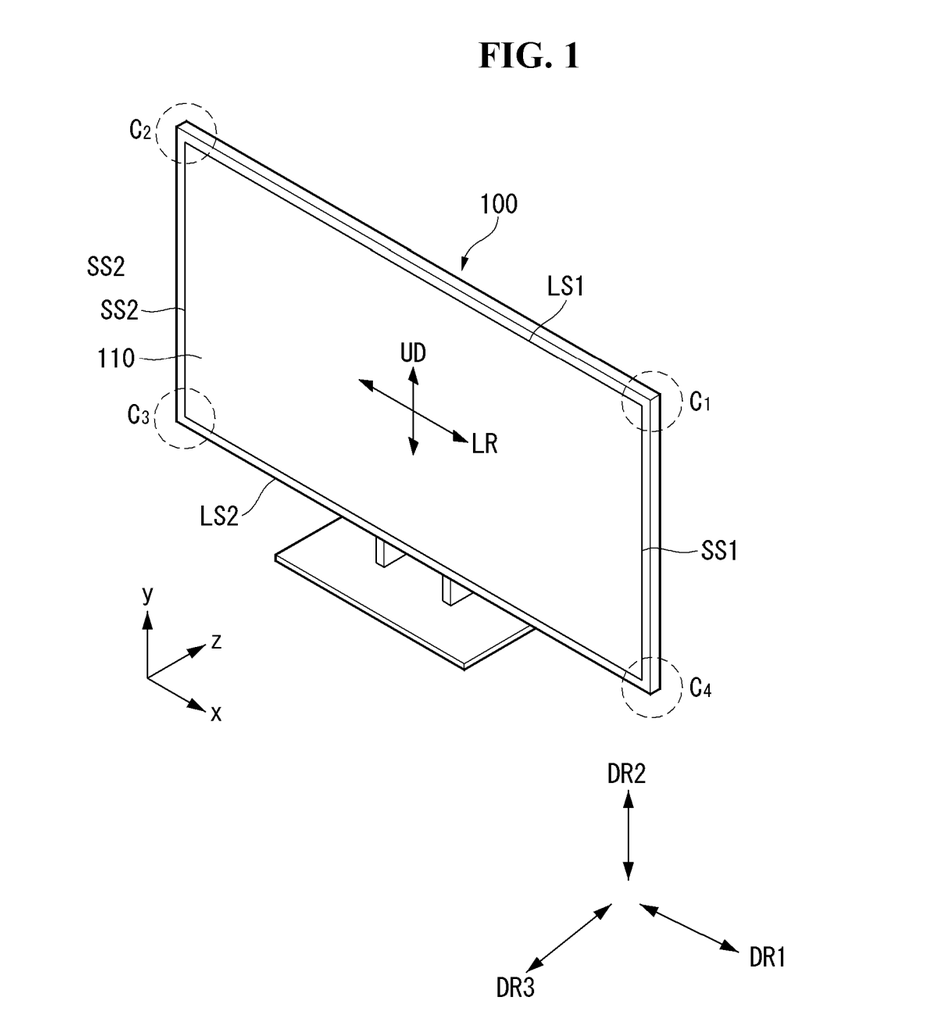
FIGS. 1 to 12 are diagrams illustrating examples of a display device according to embodiments of the present disclosure.

Referring to FIG. 1, a display device may include a first long side LS1, a second long side LS2 opposite the first long side LS1, a first short side SS1 adjacent to the first long side LS1 and the second long side LS2, and a second short side SS2 opposite the first short side SS1.

The first short side SS1 may be referred to as a first side area, the second short side SS2 may be referred to as a second side area opposite the first side area, the first long side LS1 may be referred to as a third side area which is adjacent to the first side area and the second side area and is positioned between the first side area and the second side area, and the second long side LS2 may be referred to as a fourth side area which is adjacent to the first side area and the second side area, is positioned between the first side area and the second side area, and is opposite the third side area.

For convenience of explanation, the first and second long sides LS1 and LS2 are longer in length than the first and second short sides SS1 and SS2, but it should be noted that the first and second long sides LS1 and LS2 may be approximately equal in length to the first and second short sides SS1 and SS2.

A first direction DR1 may be a direction parallel to the short sides SS1 and SS2 of the display device 100, and a second direction DR2 may be a direction parallel to the long sides LS1 and LS2 of the display device 100. A third direction DR3 may be a direction perpendicular to the first direction DR1 and/or the second direction DR2.

The first direction DR1 and the second direction DR2 may be collectively referred to as a horizontal direction. The third direction DR3 may be referred to as a vertical direction.

A side where the display device displays an image may be referred to as a front or a front surface. When the display device displays an image, a side where the image cannot be viewed may be referred to as a rear or a rear surface. When the display device is viewed from a front or a front surface, the first long side LS1 may be referred to as an upper side or an upper surface. In the same manner, the second long side LS2 may be referred to as a lower side or a lower surface. In the same manner, the first short side SS1 may be referred to as a right side or a right surface, and the second short side SS2 may be referred to as a left side or a left surface.

The first long side LS1, the second long side LS2, the first short side SS1, and the second short side SS2 may be referred to as edges of the display device. Positions where the first long side LS1, the second long side LS2, the first short side SS1, and the second short side SS2 meet may be referred to as corners.

For example, a position where the first long side LS1 and the first short side SS1 meet may be referred to as a first corner C1, a position where the first long side LS1 and the second short side SS2 meet may be referred to as a second corner C2, a position where the second short side SS2 and the second long side LS2 meet may be referred to as a third corner C3, and a position where the second long side LS2 and the first short side SS1 meet may be referred to as a fourth corner C4.

Herein, a direction from the first short side SS1 to the second short side SS2 or a direction from the second short side SS2 to the first short side SS1 may be referred to as a left-right direction LR. A direction from the first long side LS1 to the second long side LS2 or a direction from the second long side LS2 to the first long side LS1 may be referred to as an up-down direction UD.

Figure 2:
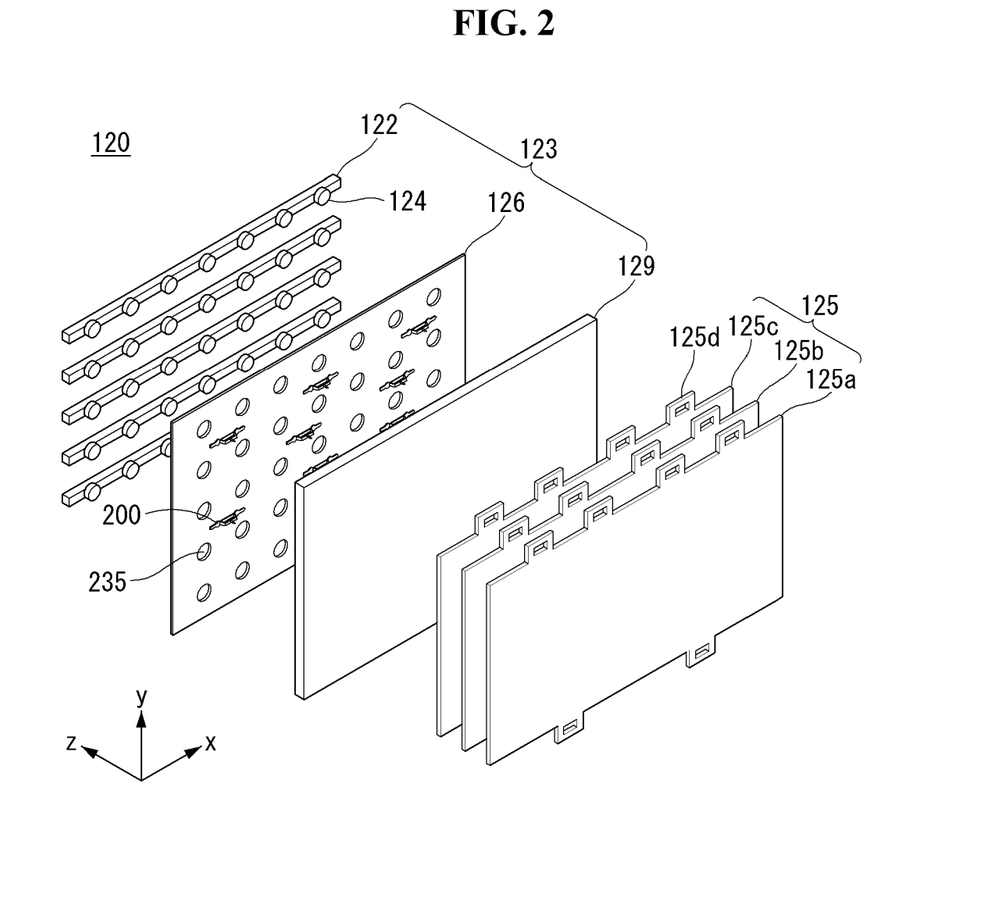

Referring to FIG. 2, the backlight unit 120 may include optical layers 123 including a substrate 122, an optical assembly 124, a reflective sheet 126, and a diffusion plate 129, and an optical sheet 125 positioned in front of the optical layers 123. The optical layers 123 may be referred to as optical modules 123.

The substrate 122 may include a plurality of straps, which extends in the first direction and is spaced apart from each other at predetermined intervals in the second direction perpendicular to the first direction.

The optical assembly 124 may be mounted on the substrate 122. The substrate 122 may have an electrode pattern for connecting an adaptor and the optical assembly 124. For example, a carbon nanotube electrode pattern for connecting the adaptor and the optical assembly 124 may be formed on the substrate 122.

The substrate 122 may be formed of at least one of polyethylene terephthalate (PET), glass, polycarbonate (PC), and silicon. The substrate 122 may be a printed circuit board (PCB) on which at least one optical assembly 124 is mounted.

The optical assembly 124 may be a light-emitting diode (LED) chip or a light emitting diode package including at least one light-emitting diode chip.

The optical assembly 124 may include a colored LED emitting at least one color among red, blue, green, etc. or a white LED. The colored LED may be a blue LED.

The reflective sheet 126 may be positioned on the substrate 122. The reflective sheet 126 may be positioned on the substrate 122 except an area where the optical assembly 124 is formed. Through-holes 235 may be formed on the reflective sheet 126.

The reflective sheet 126 may reflect light emitted from the optical assembly 124 to the front. Further, the reflective sheet 126 may reflect the light reflected from the diffusion plate 129 back to the front.

The reflective sheet 126 may include at least one of a metal and a metal oxide which are reflective materials. For example, the reflective sheet 126 may include a metal and/or metal oxide having a high reflectance, for example, at least one of aluminum (Al), silver (Ag), gold (Au), and titanium dioxide ($TiO_2$).

The reflective sheet 126 may be formed by depositing and/or coating a metal or a metal oxide on the substrate 122. An ink including a metal material may be printed on the reflective sheet 126. The reflective sheet 126 may include a deposition layer formed using a heat deposition method, an evaporation method, or a vacuum deposition method such as a sputtering method. The reflective sheet 126 may include a coating layer and/or a printing layer formed using a printing method, a gravure coating method, or a silk screen method.

An air gap may be positioned between the reflective sheet 126 and the diffusion plate 129. Light emitted from the optical assembly 124 may spread widely by the air gap. A supporter 200 may be positioned between the reflective sheet 126 and the diffusion plate 129 to maintain the air gap.

A resin may be deposited on the optical assembly 124 and/or the reflective sheet 126. The resin may function to diffuse light emitted from the optical assembly 124. The diffusion plate 129 may diffuse the light emitted from the optical assembly 124 upward.

The optical sheet 125 may be positioned at a front surface of the diffusion plate 129. A rear surface of the optical sheet 125 may be adhered to the diffusion plate 129, and a front surface of the optical sheet 125 may be adhered to the rear surface of the display panel 110.

The optical sheet 125 may include at least one sheet. Specifically, the optical sheet 125 may include one or more prism sheets and/or one or more diffusion sheets. A plurality of sheets included in the optical sheet 125 may be in an attached and/or adhered state.

The optical sheet 125 may include a plurality of sheets having different functions. For example, the optical sheet 125 may include first to third optical sheets 125a to 125c. The first optical sheets 125a may function as a diffusion sheet, and the second and third optical sheets 125b and 125c may function as a prism sheet. The number and/or positions of the diffusion sheets and the prism sheets may be changed.

The diffusion sheet can prevent light coming from the diffusion plate from being partially concentrated and can more uniformly distribute light. The prism sheet can concentrate light coming from the diffusion sheet and can allow light to be vertically incident on the display panel 110.

The coupling portion 125d may be formed on at least one of edges of the optical sheet 125. The coupling portion 125d may be formed on a long side of the optical sheet 125. The coupling portion 125d formed on a first long side and the coupling portion 125d formed on a second long side may be asymmetric. For example, the number and/or position of coupling portions 125d on the first long side may be different from the number and/or position of coupling portions 125d on the second long side.

Figure 3:
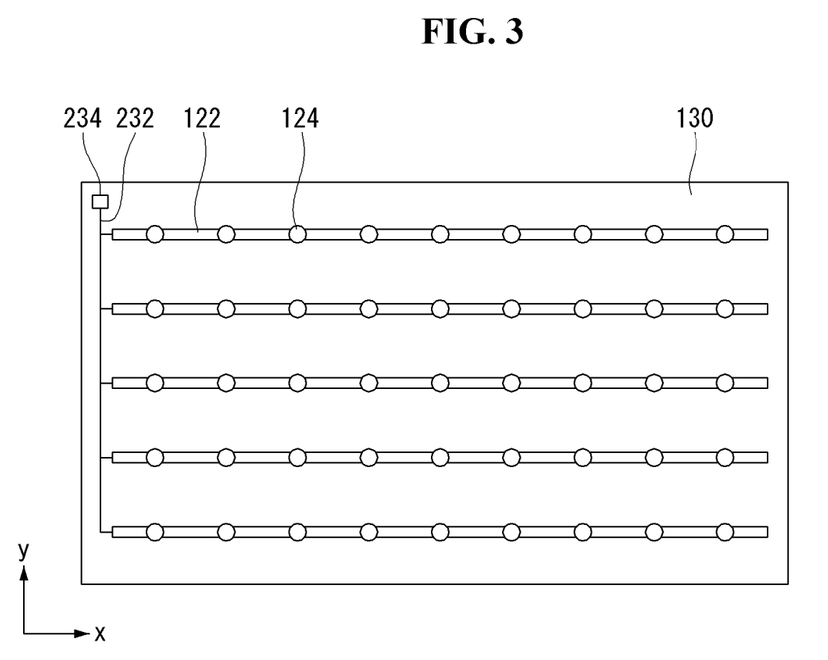

Referring to FIG. 3, a substrate 122 may be provided on the frame 130, which includes a plurality of straps which extends in the first direction and is spaced apart at predetermined intervals in the second direction perpendicular to the first direction. One end of the plurality of substrates 122 may be connected to a wiring electrode 232.

The wiring electrode 232 may extend in the second direction. The wiring electrode 232 may be connected to one end of the substrates 122 at predetermined intervals in the second direction.

A wiring hole 234 may be a hole that penetrates the frame 130. The wiring electrode 232 may be extended to the rear of the frame 130 through the wiring hole 234.

The optical assembly 124 may be mounted on the substrate 122 at predetermined intervals in the first direction. The diameter of the optical assembly 124 may be larger than the width of the second direction of the substrate 122 in the second direction.

Figure 4:
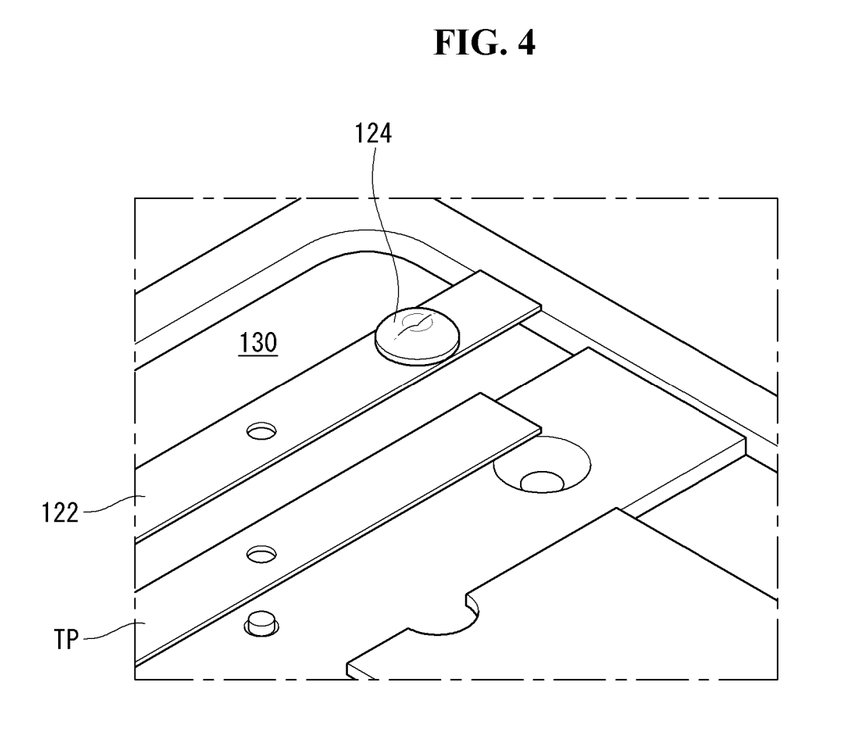

Referring to FIG. 4, the substrate 122 may be coupled to a front surface of the frame 130. The optical assembly 124 may be mounted on the substrate 122. An adhesive member TP may be positioned between the substrate 122 and the front surface of the frame 130. The adhesive member TP may be fixed to the front surface of the frame 130, and the substrate 122 may be fixed to the adhesive member TP. For example, the adhesive member TP may be double-sided tape.

In this instance, the front surface of the frame 130 may not be flat. The frame 130 may be pressed such that components of the display device 100 are seated on it or to so as to provide rigidity required for the display device 100.

Figure 5:
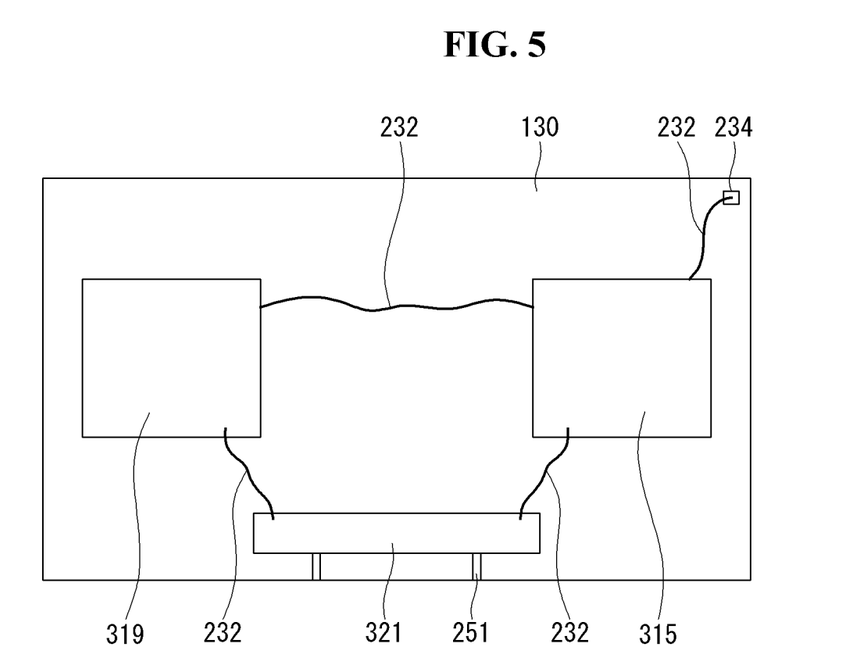

Referring to FIG. 5, the wiring electrode 232 extended from the front surface of the frame 130 through the wiring hole 234 may be connected to a power supply 315. The power supply 315 may supply power to the display device 100. The wiring electrode 232 may be referred to as a power line 232.

The power supply 315 may supply power to the optical assembly 124 positioned on the front surface of the frame 130 through the wiring electrode 232. The power supply 315 may be connected to the main board 321 through the power line 232. The main board 321 may be spaced a certain distance apart from the power supply 315.

The main board 321 may provide an interface for the display device 100 to operate. The main board 321 may check and manage the operating state of each part of the display device 100.

The main board 321 and the power supply 315 may be connected to a T-CON board 319 through the power line 232. The T-CON board 319 may transmit to the display panel 110 power or signal fed from the main board 321 or the power supply 315. The T-CON board 319 may be electrically connected to the display panel 110 in front of the frame 130 through a flat flex cable (FFC) cable 251.

Printed circuit boards have been illustrated as being connected to each other, but the present disclosure is not limited thereto, and only at least a portion of each of the printed circuit boards may be connected to each other.

Figure 6:
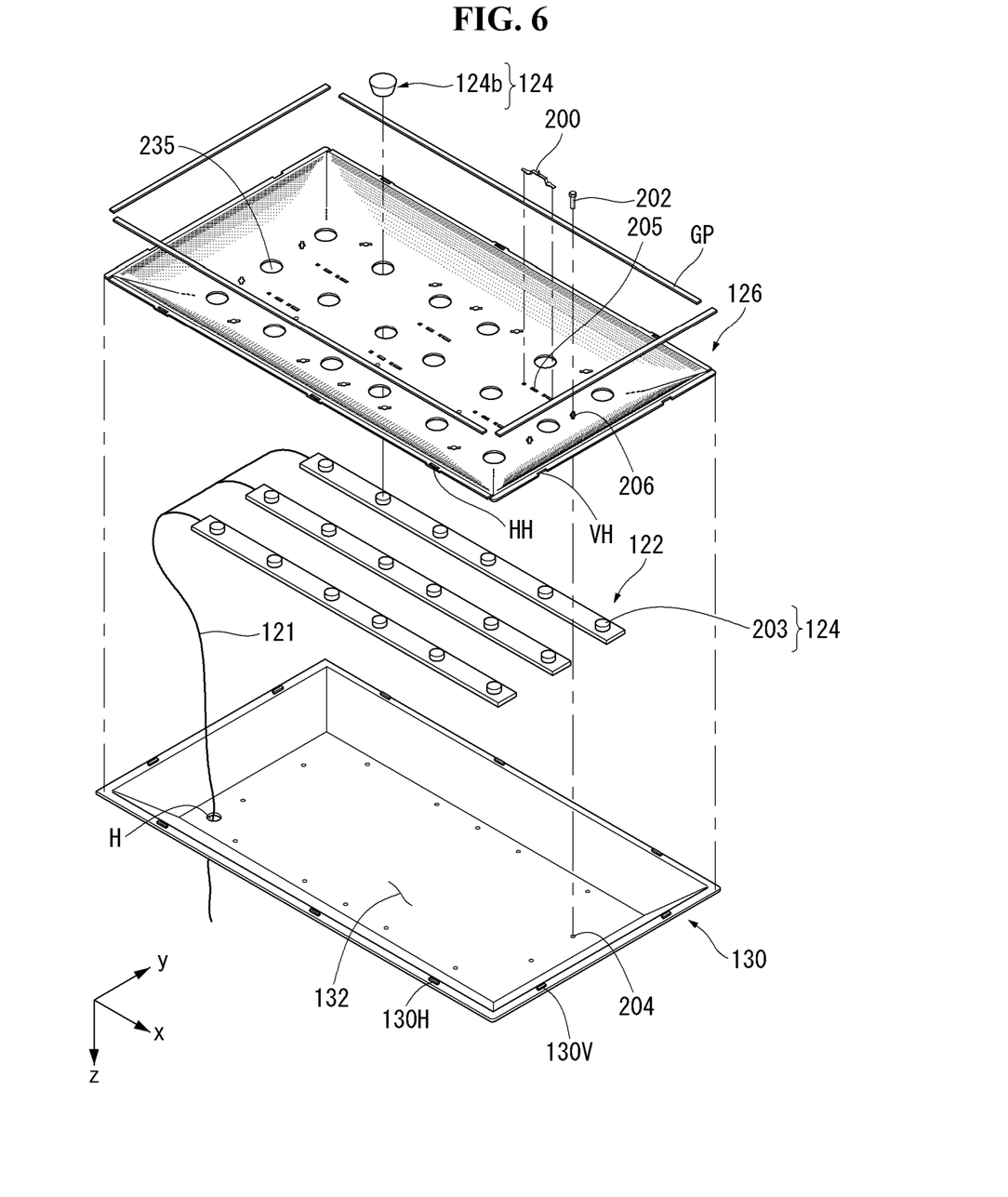

Referring to FIG. 6, the reflective sheet 126 may be coupled to the frame 130. For example, this means that the reflective sheet 126 may be seated in a seating portion 132 formed inside the frame 130.

The reflective sheet 126 may have a horizontal coupling portion HH and/or a vertical coupling portion VH. For example, coupling holes may be formed in some area along the long side and/or short side of the reflective sheet 126.

The horizontal coupling portion HH and/or the vertical coupling portion VH may be inserted into a horizontal protrusion 130H and/or a vertical protrusion 130V formed on the frame 130. A guide panel GP may be coupled onto the reflective sheet 126.

The guide panel GP may be formed of an injection-molded plastic material or a pressed metal material. The guide panel GP may be coupled to the horizontal protrusion 130H and/or the vertical protrusion 130V. When the guide panel GP is coupled onto the reflective sheet 126, the reflective sheet 126 may be fixed between the frame 30 and the guide panel GP.

The reflective sheet 126 seated in the frame 130 may have a three-dimensional shape corresponding to the shape of the seating portion 132. The reflective sheet 126 may reflect light uniformly over the entire reflective sheet 126.

The substrate 122, where light sources 203 are mounted, may be positioned between the reflective sheet 126 and the frame 130. A plurality of substrates 122 may be arranged in the horizontal direction and/or the vertical direction. The substrate 122 may be connected to a signal line 121 connected to a controller, etc., of the display device 100. The signal line 121 may be connected to the substrate 122 through holes H formed in the frame 130. The signal line 121 may be referred to as a power line 121.

The reflective sheet 126 may include a plurality of lens holes 235. The number of lens holes 235 may correspond to the number of light sources 203 on the substrate 122. The plurality of lens holes 235 may be arranged corresponding to the light sources 203. A lens 124b may be inserted into the lens hole 235.

The reflective sheet 126 may include a plurality of supporter holes 205. A supporter 200 may be coupled to the support hole 205. The supporter 200 may support the optical sheet 125 and/or the diffusion plate 129 positioned in front of the reflective sheet 126. The supporter 200 may allow the reflective sheet 126 and the diffusion plate 129 and/or the optical sheet 125 to be spaced apart by a predetermined distance.

The reflective sheet 126 may include a plurality of fixing pin holes 206. A fixing pin 202 may be coupled to the fixing pin hole 260. The fixing pin 202 may be coupled to a frame hole 204 formed in the frame 130. Thus, the fixing pin 202 may fix the reflective sheet 126 to the frame 130.

Figure 7:
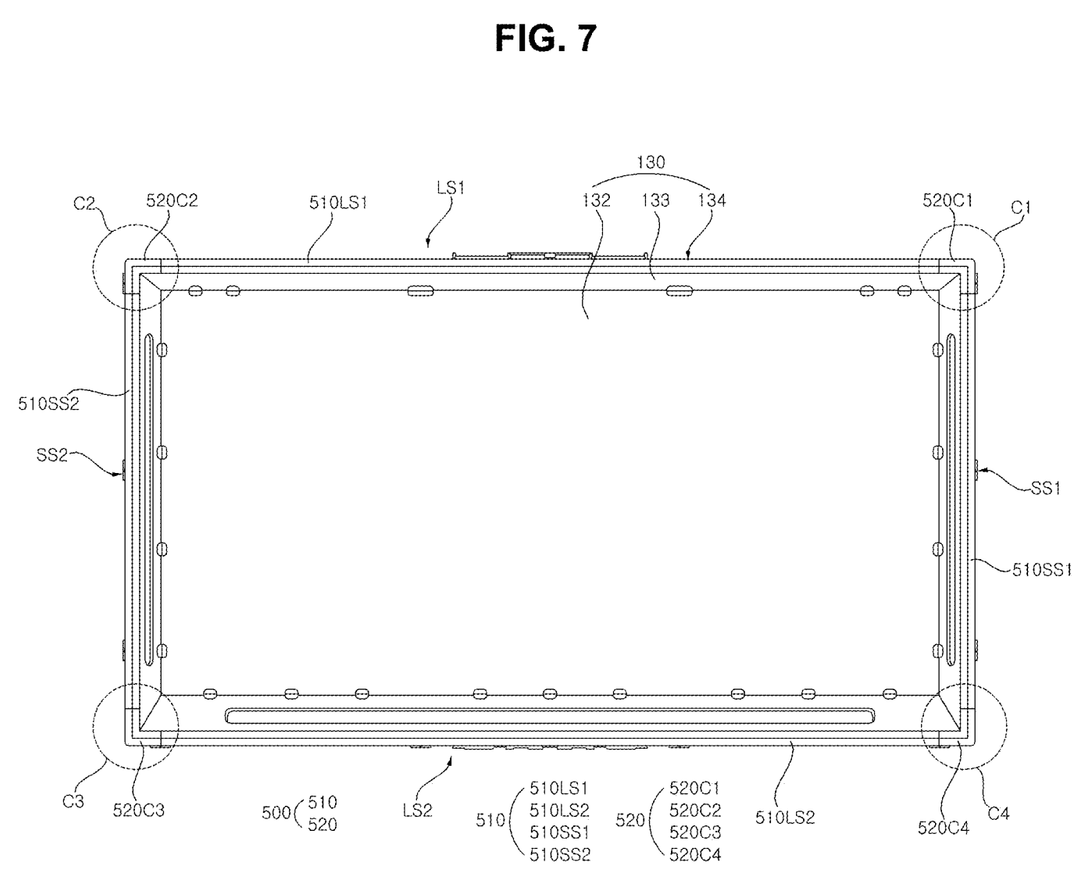

Referring to FIG. 7, the frame 130 may include a first part 132, a second part 133, and a third part 134. The first part 132 may form a bottom of the frame 130. The first part 132 may be pressed to provide an installation environment for a structure or circuitry. The second part 133 may extend from the first part 132 to the front of the frame 130. The second part 133 may have a slope. The third part 134 may be formed on a distal side of the second part 133. A plane of the third part 134 may be parallel to the first part 132. The third part 134 may form the first long side LS1, second long side LS2, first short side SS1, and second short side SS2 of the frame 130.

Guide panels 510 and 520 may be coupled onto the third part 134. The guide panels 510 and 520 may be coupled onto the third part 134. The guide panels 510 and 520 may include a side part 510 and a corner part 520. The side part 510 may include a first side part 510LS1, a second side part 510LS2, a third side part 510SS1, and a fourth side part 510SS2. The corner part 520 may include a first corner part 520C1, a second corner part 520C2, a third corner part 520C3, and a fourth corner part 520C4.

The first side part 510LS1 may be positioned on the third part 134 forming the first long side LS1 of the frame 130. The second side part 510LS2 may be positioned on the third part 134 forming the second long side LS2 of the frame 130. The third side part 510SS1 may be positioned on the third part 134 forming the first short side SS1 of the frame 130. The fourth side part 510SS2 may be positioned on the third part 134 forming the second short side SS2 of the frame 130.

The first corner part 520C1 may be positioned on the third part 134 forming the first corner C1. The second corner part 520C2 may be positioned on the third part 134 forming the second corner C2. The third corner part 520C3 may be positioned on the third part 134 forming the third corner C4. The fourth corner part 520C4 may be positioned on the third part 134 forming the fourth corner C4.

Figure 8:
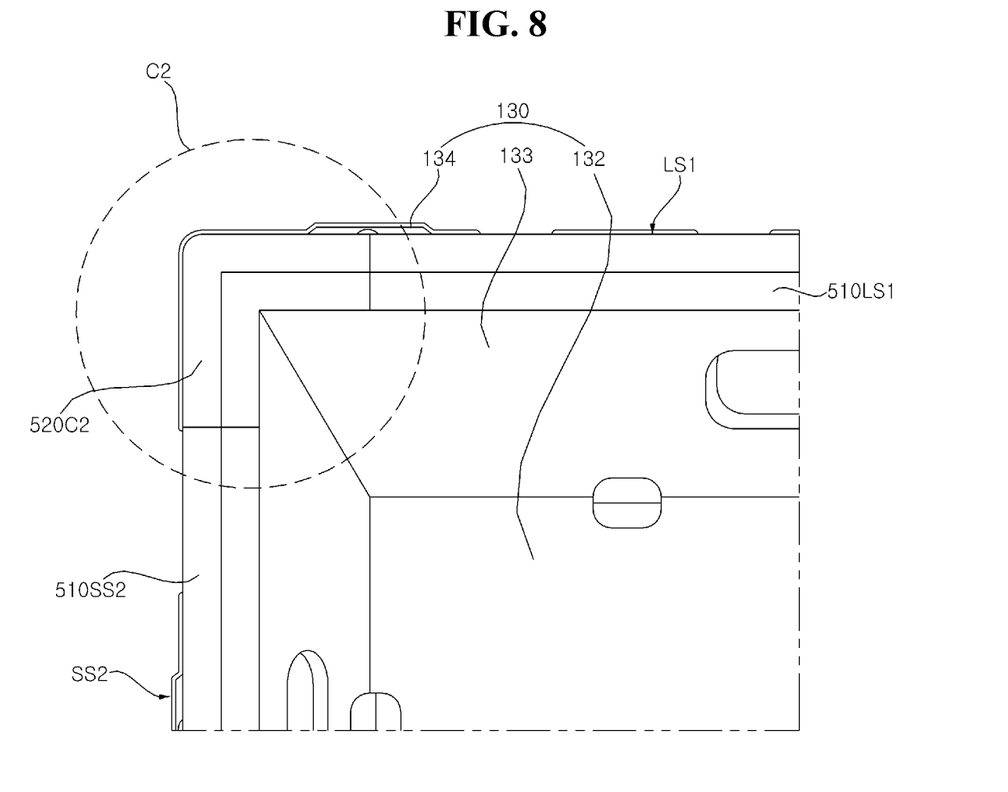

Referring to FIG. 8, the second corner part 520C2 may be mounted on the third part 134 of the frame 130 at the second corner C2. One end of the second corner part 520C2 may come into contact with the first side part 510LS1. The other end of the second corner part 520C2 may come into contact with the fourth side part 510SS2. For example, the second corner part 520C2 may include a rubber material. The first side part 510LS1 and/or the fourth side part 510SS2 may include a synthetic resin.

The first side part 510LS1 and/or the fourth side part 510SS2 may adhere to the second corner part 520C2 or compress the second corner part 520C2. Accordingly, it is possible to flexibly deal with a torsional force and/or compression and tension force applied to the guide panel 500 (see FIG. 7) and to prevent damage to the guide panel 500. Also, it is possible to prevent a corner portion of the display panel 110 from breaking easily.

Figure 9:
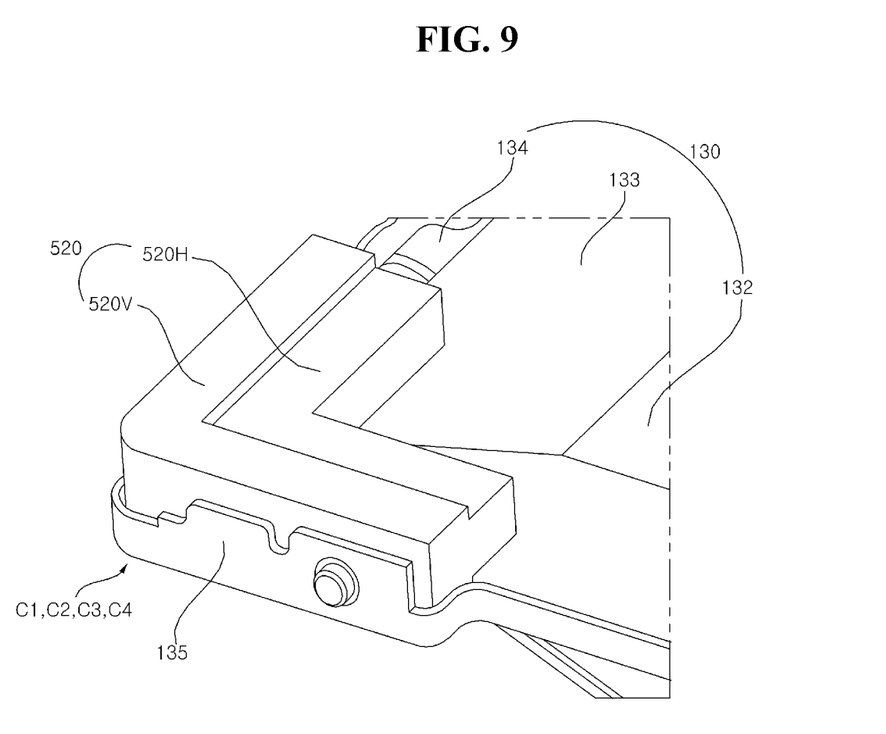

Referring to FIG. 9, the corner part 520 may have an overall L-shape. It may include a horizontal portion 520H and a vertical portion 520V. The horizontal portion 520H may form a lower plane than the vertical portion 520V while being stepped down from the vertical portion 520V. The vertical portion 520V may form a higher plane than the horizontal portion 520H while being stepped up from the horizontal portion 520H. A side wall 135 of the frame 130 may be formed around the perimeter of the third part 134 of the frame 130. The side wall 135 may support the vertical portion 520V of the corner part 520.

Figure 10:
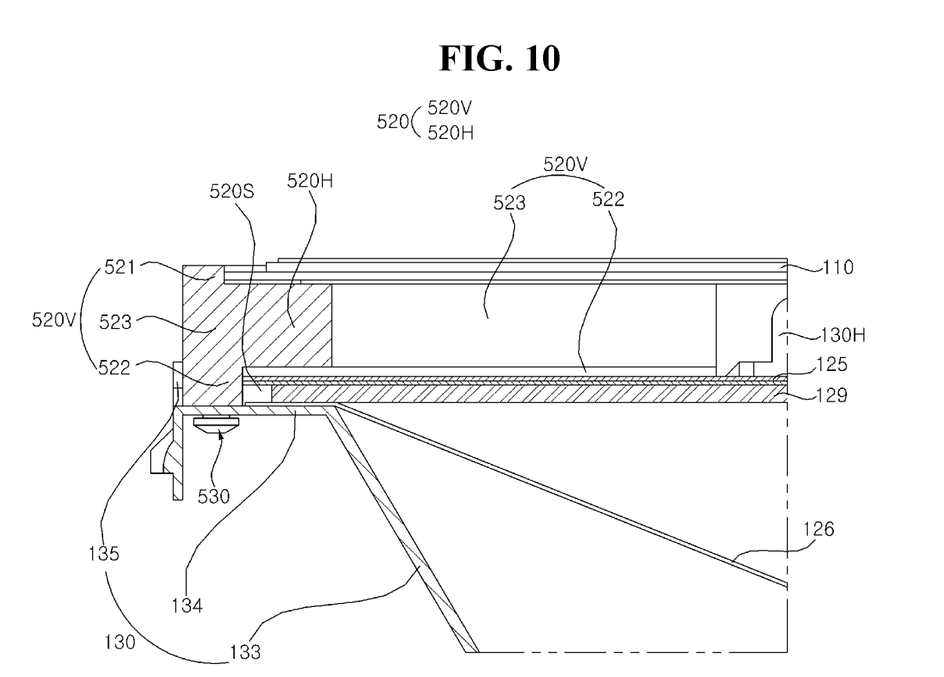
Figure 11:
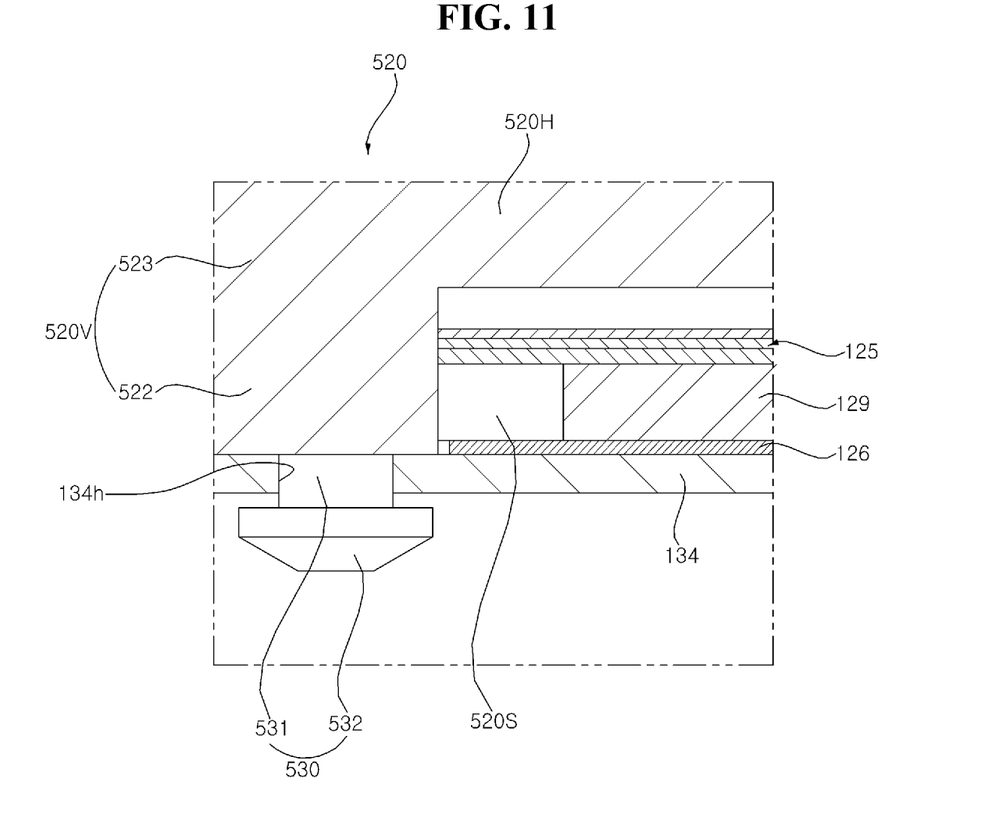

Referring to FIGS. 10 and 11, the vertical part 520V of the corner part 520 may be supported by the third part 134 of the frame 130 and the side wall 135 of the frame 130. The vertical portion 520V may be positioned on the third part 134 of the frame 130, and a side of the vertical portion 520V may be supported by the side wall 135 of the frame 130.

The corner part 520 may further include a fixing head 520. The fixing head 520 may be formed on a rear surface of the corner part 2520. The fixing head 520 may protrude from the rear surface of the corner part 520 and penetrate the third part 134 of the frame 130. The third part 134 of the frame 130 may have a fixing hole 134h into which the fixing head 530 is fitted.

A neck 531 of the fixing head 530 may extend from the corner part 520 toward the frame 130, and the head 532 may be formed on the neck 531. The diameter of the head 531 may be larger than the diameter of the neck 531. The diameter of the fixing hole 134h of the frame 130 may be substantially equal to the diameter of the neck 531, and may be smaller than the diameter of the head 532.

A support portion 520S may extend into the horizontal portion 520H between the horizontal portion 520H and the third part 134 of the frame 130. The support portion 520S may be spaced apart from the third part 134 of the frame 130 and spaced apart from the horizontal portion 520H.

The support portion 520S may be positioned on the perimeter of the third part 134, the perimeter of the reflective sheet 126 may be adhered to the third part 134 of the frame 130. Thus, the reflective sheet 126 may be firmly fixed onto the third part 134 of the diffusion plate 129.

A side of the support portion 520S may be adjacent to a side of the diffusion plate 129 or support the side of the diffusion plate 129. When the diffusion plate 129 is expanded by heat, the support portion 520S may be adhered to the diffusion plate 129. Alternatively, the support portion 520S may be compressed by the diffusion plate 129. Accordingly, it is possible to prevent movement of the diffusion plate 129 and flexibly deal with expansion or contraction of the diffusion plate 129.

The optical sheets 125 may be inserted between the support portion 520S and the horizontal portion 520H. A gap between the support portion 520S and the horizontal portion 520H may be larger than the thickness of the optical sheets 125. Consequently, the optical sheets 125 are expanded by heat, and a change in length beyond an allowable range may be covered by a space provided by the gap between the support portion 520S and the horizontal portion 520H.

The display panel 110 may be positioned on the horizontal part 520H. Accordingly, an external force exerted on the display device may be buffered or absorbed by the corner part 520, thereby preventing a corner portion of the display panel 110 from breaking easily.

Figure 12:
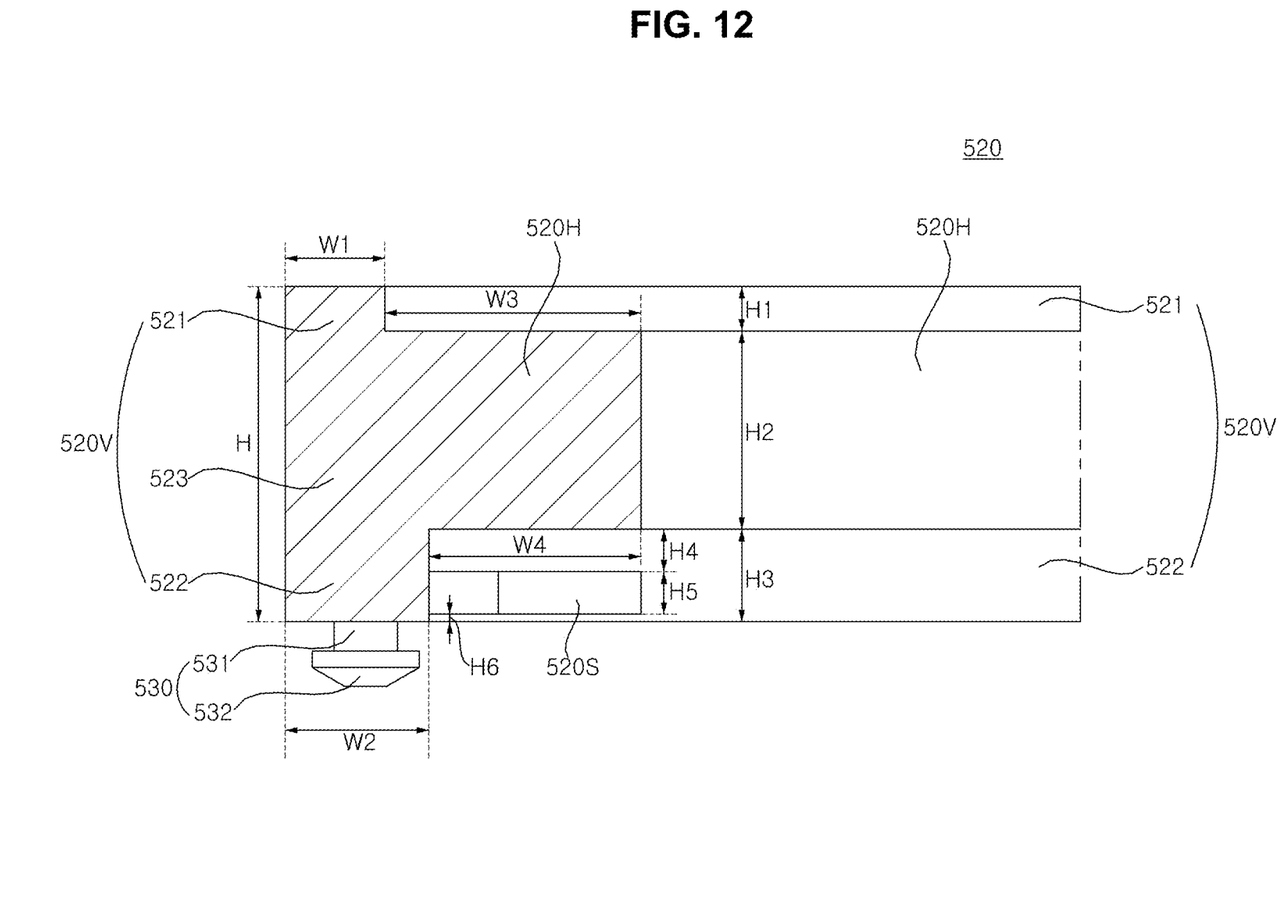

Referring to FIG. 12, the height H1 of the front part 521 of the vertical part 520V may be smaller than the height H3 of a rear part 522 of the vertical portion 520V. The height H2 of a middle part 523 of the vertical portion 520V may be greater than the height H3 of the rear part 522 of the vertical portion 520V. The sum of the height H1 of the front part 521 of the vertical portion 520V, the height H2 of the middle part 523 thereof, and the height H3 of the rear part 522 thereof may be substantially equal to the height H of the vertical portion 520V.

The height H5 of the support portion 520S may be smaller than the height H3 of the rear part 522 of the vertical portion 520V. A gap H4 formed by the support portion 520S and the horizontal part 520H may be smaller than the height H5 of the support portion 520S. A gap H6 formed by the support portion S and the bottom may be smaller than the gap H4 formed by the support portion 520S and the horizontal part 520H.

The width W1 of a front surface of the vertical portion 520V may be smaller than the width W2 of a rear surface of the vertical portion 520V. The width W3 of a front surface of the horizontal portion 520H may be larger than the width w4 of a rear surface of the horizontal portion 520H.

According to an aspect of the present disclosure, there is provided a display device comprising: a display panel; a frame positioned at the rear of the display panel; an optical assembly which is positioned between the display panel and the frame and provides light to the display panel; and a guide panel which is positioned between the circumference of the display panel and the circumference of the frame, is coupled to the frame so as to support the display panel, and has elasticity.

According to another aspect of the present disclosure, the guide panel includes: a horizontal portion that supports a corner portion of the display panel; and a vertical portion that is stepped from the horizontal portion and covers a side of the display panel, wherein the vertical portion includes: a front part covering a side of the display panel; a middle part connected to the horizontal portion; and a rear part that keeps the horizontal portion apart from the frame.

According to another aspect of the present disclosure, the guide panel further includes a support portion that protrudes and extends from an inside of the rear part of the vertical portion and is spaced apart from the horizontal portion and the frame.

According to another aspect of the present disclosure, the display device further comprises: a substrate positioned on the frame, where the optical assembly is mounted; a reflective sheet positioned on the substrate, that reflects light provided by the optical assembly toward the display panel; a diffusion plate positioned between the optical assembly and the display panel, that diffuses light provided by the optical assembly; and an optical sheet positioned between the display panel and the diffusion plate, wherein the support portion is positioned on a portion of an upper surface of the reflective sheet and supports a side of the diffusion plate.

According to another aspect of the present disclosure, the optical sheet is inserted into a space formed between the support portion and the horizontal portion, wherein the space is larger than the thickness of the optical sheet.

According to another aspect of the present disclosure, the display device further comprises a fixing head that protrudes from the rear part toward the frame, and that penetrates the frame and fixes the guide panel to the frame.

According to another aspect of the present disclosure, the frame includes: a first part facing the display panel, where the substrate is mounted, a second part extending with a slope from the first part toward the display panel; and a third part extending from the second part in a direction parallel to the display panel, wherein the third part includes a fixing hole to which the fixing head is fixed, wherein the fixing head includes: a neck positioned at the fixing hole; and a head positioned on a rear surface of the fixing hole and formed on the neck, wherein the diameter of the head is larger than the diameter of the fixing hole, and the diameter of the neck is substantially equal to the diameter of the fixing hole.

According to another aspect of the present disclosure, the frame further includes a side wall that is formed on an edge of the third part and supports the vertical portion of the guide panel.

According to another aspect of the present disclosure, the guide panel includes: a side part that supports part of a rear surface of one side of the display panel; and a corner part that supports part of a rear surface of a corner of the display panel, wherein the side part is in contact with the corner part.

According to another aspect of the present disclosure, the side part is formed of a different material from the corner part.

Certain embodiments or other embodiments of the disclosure described above are not mutually exclusive or distinct from each other. Configurations or functions of embodiments of the disclosure described above may be used together or combined with each other.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

The above detailed description should not be construed as restrictive in all respects and should be considered as illustrative. The scope of the present invention should be determined by reasonable interpretation of the appended claims, and all modifications within the equivalent scope of the present invention are included in the scope of the present invention.

The invention claimed is:

1. A display device comprising:
a display panel;
a frame positioned at a rear of the display panel;
an optical assembly positioned between the display panel and the frame and providing light to the display panel;
a diffusion plate positioned between the optical assembly and the display panel, and diffusing light provided by the optical assembly;
an optical sheet positioned between the display panel and the diffusion plate;
a guide panel coupled to the frame between the display panel and the frame, and supporting the display panel,
wherein the guide panel includes a corner part supporting a rear surface of a corner of the display panel,
wherein the corner part of the guide panel comprises:
a horizontal portion supporting the rear surface of the corner of the display panel; and
a vertical portion extending from the horizontal portion in a forward direction and a rearward direction of the horizontal portion such that the vertical portion includes:
a front part covering a side of the display panel;
a middle part connected with the horizontal portion;
a rear part covering a side of the optical sheet and a side of the diffusion plate; and
a support portion protruding and extending from an inside of the rear part of the vertical portion, the support portion forming a first gap between the support portion and the horizontal portion and a second gap between the support portion and the frame, the first gap is greater than the second gap,
wherein the optical sheet is inserted into the first gap such that a space is formed between a front surface of the optical sheet and a rear surface of the horizontal portion of the guide panel, and
wherein the support portion faces or contacts a side of the diffusion plate.

2. The display device of claim 1, further comprising:
a substrate positioned on the frame, the optical assembly mounted on the substrate; and
a reflective sheet positioned on the substrate, and reflecting light provided by the optical assembly toward the display panel.

3. The display device of claim 2, wherein
the space is larger than the thickness of the optical sheet.

4. The display device of claim 3, wherein the guide panel further comprises a fixing head protruding from the rear part toward the frame, the fixing head penetrating the frame and fixing the guide panel to the frame.

5. The display device of claim 4, wherein the frame includes:
a first part facing the display panel, on which the substrate is mounted;
a second part extending with a slope from the first part toward the display panel; and a third part extending from the second part in a direction parallel to the display panel,
wherein the third part includes a fixing hole to which the fixing head is fixed,
wherein the fixing head includes:
a neck positioned at the fixing hole; and
a head positioned on a rear surface of the fixing hole and formed on the neck,
wherein the diameter of the head is larger than the diameter of the fixing hole, and the diameter of the neck is substantially equal to the diameter of the fixing hole.

6. The display device of claim 5, wherein the frame further includes a side wall that is formed on an edge of the third part and supports the vertical portion of the guide panel.

7. The display device of claim 1, wherein the guide panel further includes:
a side part that supports part of a rear surface of one side of the display panel, and
wherein the side part is in contact with the corner part.

8. The display device of claim 7, wherein the side part is formed of a different material from the corner part.

* * * * *